(12) United States Patent
Kelley

(10) Patent No.: US 11,634,855 B1
(45) Date of Patent: *Apr. 25, 2023

(54) MAGNETICALLY POSITIONED AND ENGAGED DRYER VENT ATTACHMENT AND METHOD

(71) Applicant: Kevin Patrick Kelley, Asheville, NC (US)

(72) Inventor: Kevin Patrick Kelley, Asheville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,073

(22) Filed: Apr. 20, 2022

Related U.S. Application Data

(63) Continuation of application No. 16/858,023, filed on Apr. 24, 2020, now Pat. No. 11,359,328, which is a continuation of application No. 15/825,998, filed on Nov. 29, 2017, now Pat. No. 10,633,783, which is a continuation of application No. 12/804,691, filed on Jul. 27, 2010, now abandoned.

(51) Int. Cl.
*D06F 58/20* (2006.01)
*F16L 37/00* (2006.01)

(52) U.S. Cl.
CPC ............ *D06F 58/20* (2013.01); *F16L 37/004* (2013.01)

(58) Field of Classification Search
CPC .............................. D06F 58/20; F16L 37/004
See application file for complete search history.

(56) References Cited

U.S. PATENT DOCUMENTS

| | | | |
|---|---|---|---|
| 4,081,915 | A | 4/1978 | Materniak Nee Babcerowicz et al. |
| 5,121,948 | A | 6/1992 | Anderson et al. |
| 5,318,328 | A | 6/1994 | Dawson |
| 5,584,129 | A | 12/1996 | Williamson |
| 5,970,623 | A | 10/1999 | Tuggle |
| 6,065,210 | A | 5/2000 | Bove |
| 6,463,673 | B1 | 10/2002 | Gherna |
| 6,584,702 | B2 | 7/2003 | Irey |
| 10,633,783 | B1 | 4/2020 | Kelley |
| 11,359,328 | B1 * | 6/2022 | Kelley .................... D06F 58/20 |
| 2004/0237330 | A1 | 12/2004 | Fuller |
| 2005/0052018 | A1 | 3/2005 | Pichotta |
| 2006/0283511 | A1 | 12/2006 | Nelson |
| 2008/0143098 | A1 | 6/2008 | Zimmerman et al. |
| 2010/0066082 | A1 | 3/2010 | Aubert |

* cited by examiner

*Primary Examiner* — Jessica Yuen
(74) *Attorney, Agent, or Firm* — Schwartz Law Firm, P.C.

(57) ABSTRACT

A magnetically positioned dryer vent coupling is adapted for use in combination with a clothes dryer. The dryer vent coupling includes a flexible exhaust duct, a first mounting substrate, and a second mounting substrate. The first mounting substrate is located at one end of the flexible exhaust duct and includes a first magnet. The second mounting substrate is adapted for residing proximate one of the dryer exhaust port and wall port, and includes a second magnet. When moved into close proximity, the first and second magnets magnetically attract to one another to self-align and self-assemble the first and second mounting substrates of the dryer vent coupling, such that the first and second mounting substrates create an audible snapping sound when engaged thereby indicating a close magnetic seal at the dryer vent coupling.

18 Claims, 5 Drawing Sheets

MAGNETICALLY POSITIONED AND
ENGAGED DRYER VENT ATTACHMENT
AND METHOD

BACKGROUND OF THE INVENTION

Field of Invention

This invention relates in general to the completion of an exhaust circuit from the exhaust port of a conventional clothes dryer to the outside of a building for removal of heat and water vapor, more specifically, the invention relates to the problem created when trying to make the connection at the dryer port and where the circuit leaves the adjacent wall.

Prior Art

Due to aesthetics and practical concerns, the dryer exhaust port is usually positioned at the rear of the dryer, the dryer itself often consisting of a relatively large (in comparison to human proportions) metal chassis, and often surrounded on three sides with walls or two walls and an adjacent washer in its final installation, thereby obstructing the access required to make the connection from the dryer port to where it exits the room. The conventional method is to make said connection with a piece of flexible duct of such length as to allow a human sufficient space behind the dryer to make said connection and then escape. The dryer is then pushed back into position often kinking, compressing, and double-backing said flexible duct. These situations cause restricted air flow which immediately impacts dryer efficiency and quickly leads to excessive lint buildup and excessive heat accumulation. These conditions are the cause of many dryer fires.

Various attempts to solve this problem are disclosed in U.S. Pat. No. 5,318,328 (Dawson), U.S. Pat. No. 5,584,129 (Williamson), U.S. Pat. No. 5,970,623 (Tuggle), and U.S. Pat. No. 6,584,702 (Irey).

U.S. Pat. No. 5,318,328 describes a manually aligned quick coupling with magnetic holding to the dryer port, while the other end of the coupling is designed to thread into a conventional flexible dryer exhaust hose. This Patent, therefore, does not address the issues created with the length of flexible exhaust hose.

U.S. Pat. No. 5,584,129 describes a funnel shaped wall attachment aimed at guiding a short length of rigid pipe extending from the dryer port into place as the dryer is slid into position against the wall. While this invention does eliminate the flexible dryer exhaust hose, it requires an accurate placement of the funnel shaped wall piece to not excessively strain the dryer port as the dryer is pushed into place.

U.S. Pat. No. 5,970,623 contemplates a length of pipe coming up from the dryer port to above the dryer itself where a manual connection may be assuredly and conveniently made. This method would be found aesthetically unpleasing to many homeowners and may introduce excessive vertical duct length.

U.S. Pat. No. 6,584,702 describes a magnetic coupling of flexible magnetic material attached conventionally at the dryer port and a sheet metal plenum attached at the wall. The device does away entirely with flexible exhaust hose and maintains a minimal distance to the rest of the exhaust circuit. Theoretically this device addresses the problem, however the practical execution would likely reveal difficulty in maintaining an adequate seal, due to lack of planarity in the sheet metal face. The device also lacks any sort of stop for side-to-side travel, making it susceptible to being knocked out of alignment by an out of balance washing machine or similar bumping forces. Cases where the sheet metal plenum is not entirely flush with the wall or the wall itself is not entirely plumb, would compromise the soundness of the described magnetic seal. This device also suffers from having no means to properly align the openings in the metal plenum and the flexible magnetic sheet creating the potential for a seal that partially or total blocks the dryer vent path. A final drawback to this device would be the difficulty in distinguishing between a full or partial seal.

OBJECTS AND ADVANTAGES

The present invention seeks to solve the aforementioned problems by eliminating the long piece of flexible duct required to provide human access by use of a magnetically positioned and engaged coupling. Said coupling being in two parts allows for their manual attachment to be done with the dryer a comfortable distance away from the wall. Once the respective parts of the coupling are securely installed, the dryer can be pushed into place allowing the magnetically positioned coupling, described herein, to self-align and self-engage completing the exhaust circuit. The short length of accordion hose described herein will allow for inaccuracy in the installation of the wall box, and will tolerate the bumps, vibrations and translocations experienced by a typical clothes dryer.

One advantage of the implementation of this technology that may not be readily apparent is that it allows for and may encourage a transition towards dryer duct circuits being run entirely with rigid metal pipes with relatively smooth internal walls. Such a trend would greatly increase the maintainability of the duct, specifically such ducting is capable of being swept for lint without risk of tearing or disengaging the ducting. The absence of excessive length of double-backed flexible duct will decrease lint traps, decrease resistance to flow in the dryer vent circuit, increase dryer efficiency, and increase fire safety. The relative ease with which said coupling could be engaged and disengaged may encourage more frequent homeowner maintenance, further increasing the fire safety and dryer efficiency. This device should prove particularly useful to appliance retailer and professional installers by providing a fast and effective means to complete the dryer exhaust circuit, particularly useful in confined installations, thereby increasing the number of units installed in a day and reducing call backs for broken flex duct.

Further objects and advantages will become apparent from a consideration of the ensuing description and drawings.

SUMMARY OF THE INVENTION

The purpose of the invention is to allow for a magnetically aligned and engaged dryer vent coupling. The device being constructed of two separable pieces roughly tubular in nature. One piece having a female end of such an internal diameter as to receive the exhaust port of a clothes dryer, continuous with this end is a length of flexible tube that is linearly extensible, the flexible tube is continuously attached to the other end being fitted with a powerful magnetic material. The second piece of the device also having two ends: one having a magnetic end of an opposite polarity arrangement to that of the first piece so as to powerfully attract and positively mate with the other magnetic end when brought into proximity to the other half; the opposite end of the second piece being male in nature and more generally designed to couple to the remainder of the dryer exhaust circuit leading out of the room.

DETAILED DESCRIPTION OF THE INVENTION

Figure 1:
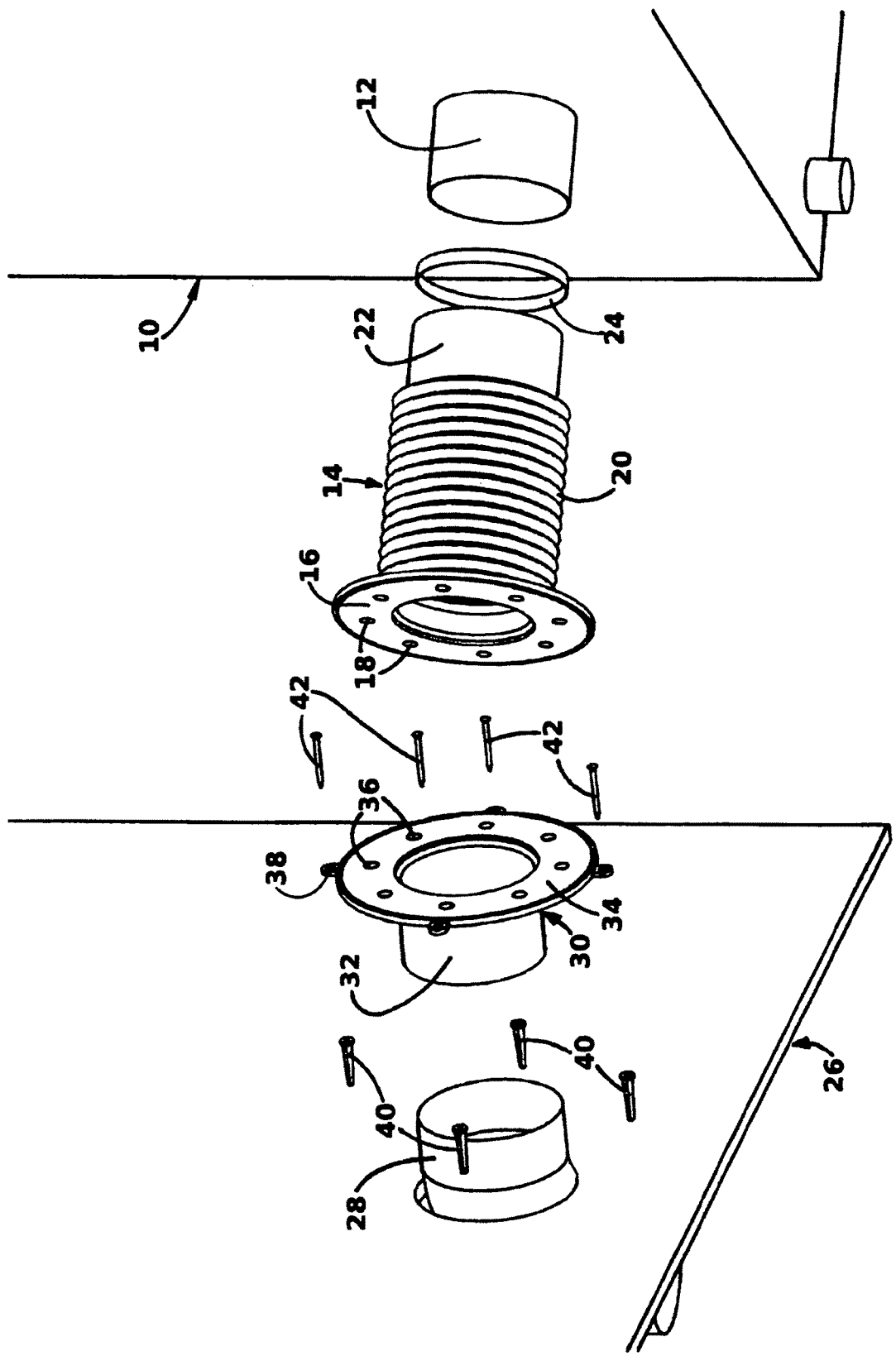
FIG. 1 is an exploded view of the two main pieces of the invention and illustrates their placement between the dryer exhaust port and the point where the exhaust system leaves the room. The flexible, linearly extensible accordion portion is located between the female end attaching to the dryer exhaust port and one portion of the magnetically aligned and engaged coupling. The other piece of the device with mating magnetic coupling and wall attachment and duct connection is also pictured.

FIG. 1 depicts the device under discussion which allows for magnetically aligned and engaged dryer exhaust circuit connection in the confined space behind a clothes dryer. The device has two halves 14 and 30. The parts a generally tubular in nature having an open space on the interior allowing for the passage of dryer exhaust. 12 represents the dryer exhaust port of a clothes dryer 10. Typically, 12 is approximately 4 inches in diameter, but could vary in size and the corresponding sizes of the invention could be varied in order to accommodate any such variations in the size of 12. 14 consists of the dryer side of the coupling and has female end 22 which is appropriately sized to slide over 12. 14 is secured to 12 via a hose clamp 24, which may be of screw, spring, or similar known type. 20 represents a section of accordion tube that is to some degree linearly or axially extensible. 20 is preferably constructed of rubber type material such as silicone, polyurethane, or the like but could be constructed of standard flex duct type material, that being coiled steel embedded in or adhered to plastic or metal foil, or other known. 20 is integral with or has a sealed attachment to 16 and 22, and may be constructed of silicone, polyurethane, polyvinyl chloride, or other known high temperature plastics. 16 is the substrate of the dryer half of the coupling, the surface of which is appropriately smooth to allow for a effective seal when engaged with 34. 16 has embedded in its construction a plurality of radially symmetrically arranged rare earth magnets 18 all of which have their polarity oriented in the same direction, for example all north magnetic poles outwardly aligned in the direction of 30. 16 and 34 are preferably constructed of a heat resistant hard plastic such as ABS, PVC, etc, but could be constructed of rubber type materials or even non-ferromagnetic metals such as aluminum. It may be desirable for freedom of motion to construct 16 of minimal weight using either foam or a hollow core construction.

30 is the wall side of the magnetic coupling and has a substrate 34, similar to that of 16. A notable difference being the flanges with mounting holes 38, which allow for attachment to the wall or mounting box. Optional mounting screws or nails 42 may be screwed into available wood blocking or wall studs, drywall anchors 40 or toggle bolts may be used as dictated by the particulars of the installation at hand. The face of 34 also contains a radially, symmetrically arranged plurality of rare earth magnets 36, with all of the poles aligned in the same direction such that the poles are opposite to that of, and thus powerfully attracted to, the magnets 18 of 14. For example, if the magnets of 14 are arranged with north poles facing 30, the magnetic poles of the magnets embedded in 34 would be arranged such that all south pole would be facing 14. 30 has at its far end 32 which is a male adapted end, slightly less than 4 inches in diameter, suitable for coupling to the remainder of the dryer exhaust circuit 28. 26 is drywall, cinder block, concrete or other wall material.

28 could be of any conventional type of duct. Though not specifically part of the invention, not intending to limit the types of ducting the disclosed invention is used with, it is the express purpose of this invention to provide a safer more easily maintained dryer exhaust method, it is therefore desirable that 28 be made of rigid metal pipe as opposed to flexible duct often used. The pipe of 28 preferably takes the shortest possible path out of the building with the minimum number of sharp bends. Metal duct installed in this general manner would tend to accumulate less lint (often present in the dryer exhaust stream) than flexible duct due largely to its smooth interior faces. Such rigid metal duct would be able to be scrubbed with an appropriately sized duct brush with less possibility of ripping the duct in an inaccessible part of the wall, floor, or ceiling cavity.

The device functions by the following general method. With the dryer a comfortable distance away from the wall, attachment of 14 to 12 and 30 to 28 is made by conventional means. The dryer is then pushed into place, allowing the opposing magnetic fields of magnets 18 and 36 to come into proximity of the other, at which time they will powerfully attract one another and move toward each other with the flexibility and articulation provided by 20. An audible snapping sound, created by opposing magnetic faces contacting each other, will accompany positive engagement of the magnetic coupling. The audible sound will serve as an indicator to the installer that the connection has been made.

Figure 3:
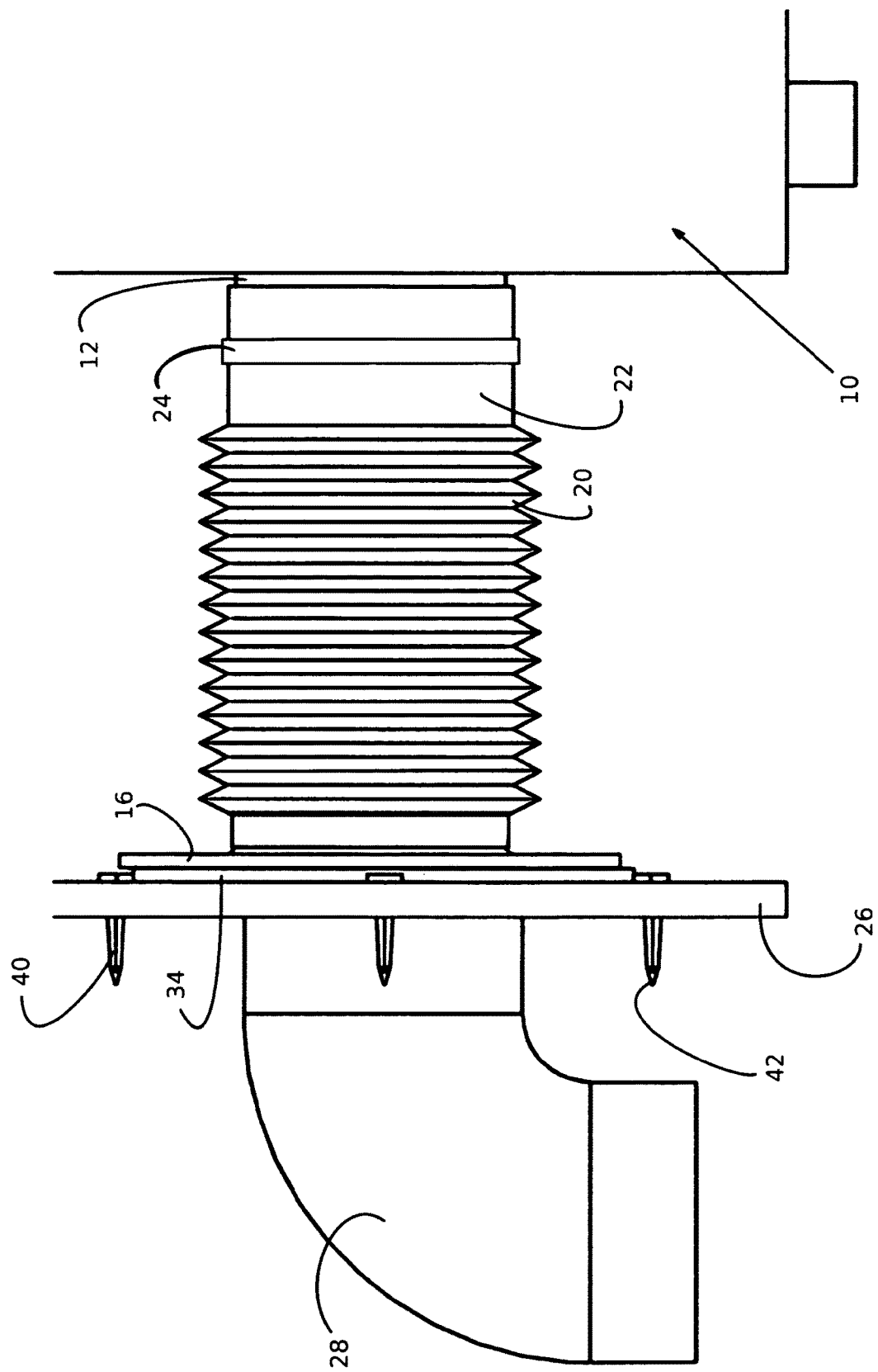
FIG. 3 is a view of the coupling installed and completing the dryer exhaust circuit.
Figure 4:
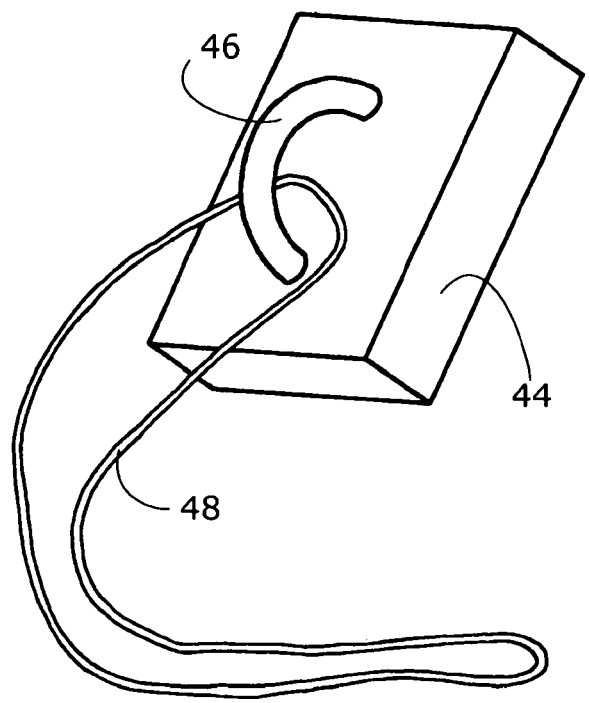
FIG. 4 is a detail of an elastic loop and attached magnet to aid in positioning the dryer side of the coupling at the approximate height of the wall coupling.
Figure 5:
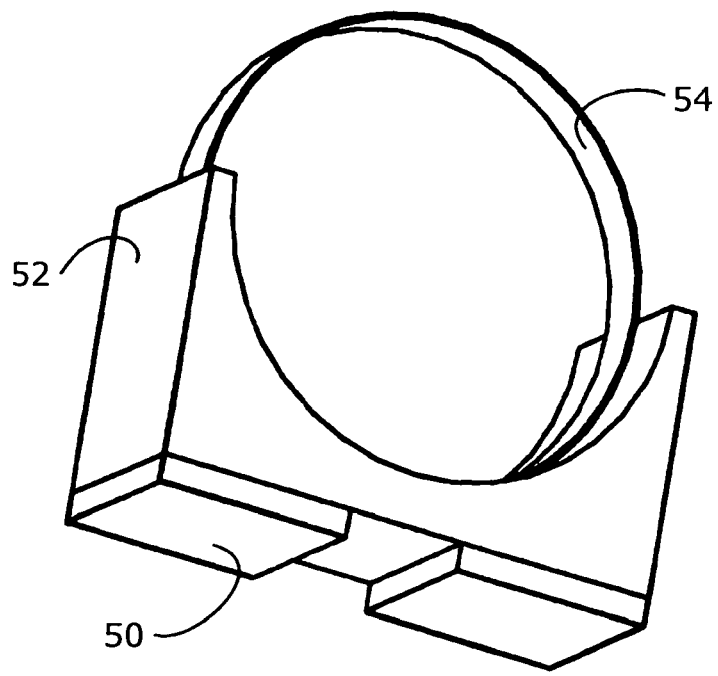
FIG. 5 is a detail of a magnetic base with strap used in installations where the dryer side of the coupling is required to be held perpendicular to the dryer exhaust port.

FIG. 3 depicts the device installed completing the dryer exhaust circuit.

Figure 2:
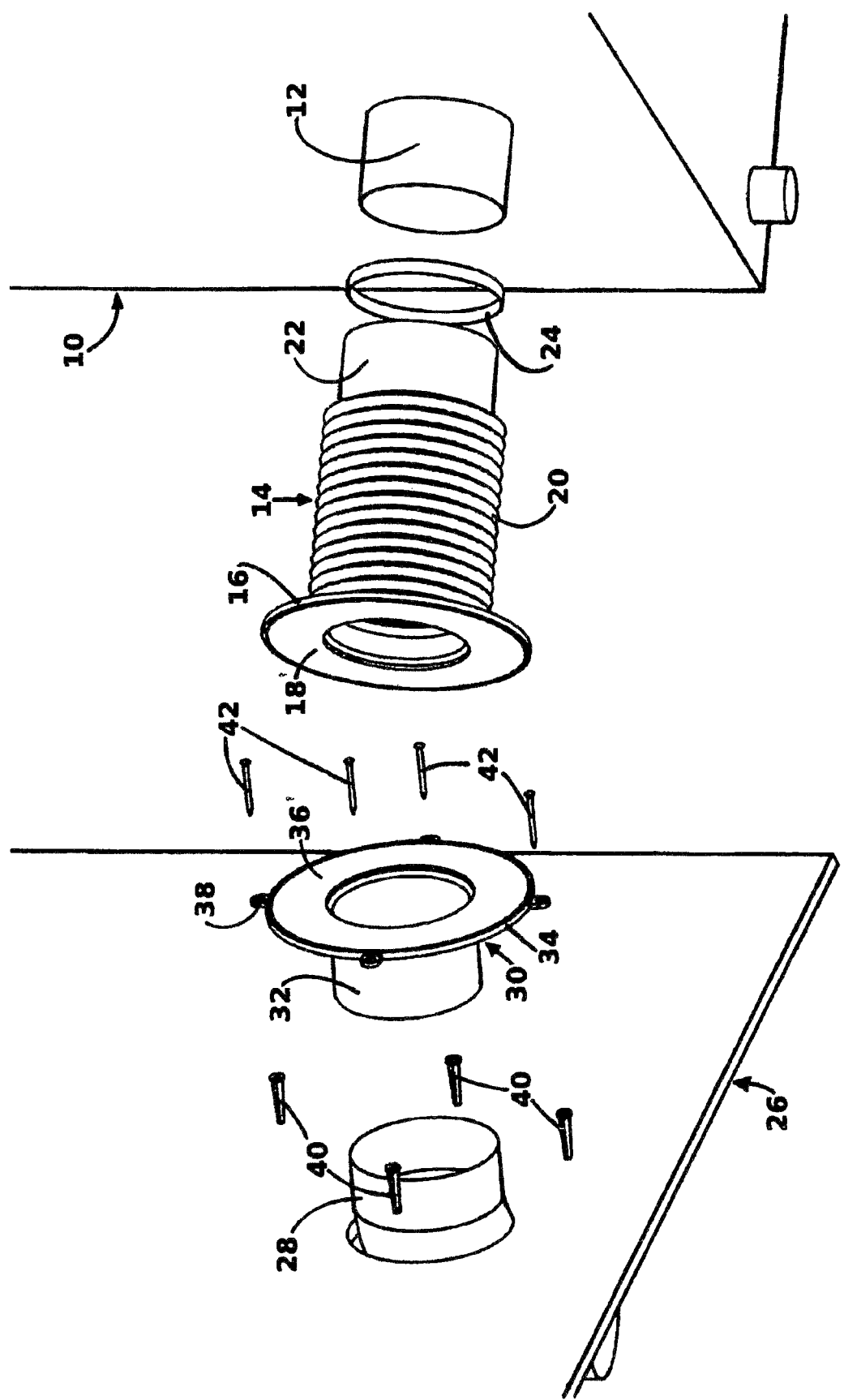
FIG. 2 is similar to that of FIG. 1, except for where the magnetic material is in the shape of a flattened toroid.

FIGS. 2 and 3—Additional Embodiments

FIG. 2 depicts the device under discussion which allows for magnetically aligned and engaged dryer exhaust circuit connection in the confined space behind a clothes dryer. The device of FIG. 2 is analogous in its function and structure to that of FIG. 1, the difference being that FIG. 2 depicts a likely alternate magnet geometry and arrangement. These differences cause the seal to be formed between the magnetic faces of 18' and 36' rather than at the faces of, or a lip on, 16 and 34. The device has two halves 14 and 30. The parts a generally tubular in nature having an open space on the interior allowing for the passage of dryer exhaust. 12 represents the dryer exhaust port of a clothes dryer 10. Typically, 12 is approximately 4 inches in diameter, but could vary in size and the corresponding sizes of the invention could be varied in order to accommodate any such variations in the size of 12. 14 consists of the dryer side of the coupling and has female end 22 which is appropriately sized to slide over 12. 22 is attached to 12 via a hose clamp 24, which may be of screw, spring, or similar known type. 20 represents a section of accordion tube that is to some degree linearly or axially extensible. 20 is preferably constructed of rubber type material such as silicone, polyurethane, or the like but could be constructed of standard flex duct type material, that being coiled steel embedded in or adhered to plastic or metal foil, or other known. 20 is integral with or has a sealed attachment to 16 and 22, and may be constructed of silicone, polyurethane, polyvinyl chloride, or other known high temperature plastics. 16 is the substrate of the dryer half of the coupling. 16 has embedded in its construction, or attached via a high temperature adhesive, such a silicone, a flattened toroid magnet 18' surrounding the opening. 18' is most likely a ceramic ferrite magnet, but could be a neodymium rare earth magnet, or ferrite embedded in a rubber matrix. 16 and 34 are preferably constructed of a heat resistant hard plastic such as ABS, PVC, etc, but could be constructed of rubber type materials or even non-ferromagnetic metals such as aluminum, magnesium alloy, or other. It may be desirable for freedom of motion to construct 16 of minimal weight using either foam or a hollow core construction.

30 is the wall side of the magnetic coupling. 34 is similar to 16, a notable difference being the flanges with mounting holes 38, which allow for attachment to the wall or mounting box. Optional mounting screws or nails 42 may be screwed into available wood blocking or wall studs, drywall anchors 40 or toggle bolts may be used as dictated by the particulars of the installation at hand. The face of 34 contains toroid magnet 36', mounted such that the direction of its pole is same as that of, and thus powerfully attracted to, the magnet 18' of 14. For example, if the magnet of 14 is arranged with its north pole facing 30, the magnetic pole of the magnet embedded in 34 would be arranged such that its south pole would be facing 14. 30 has at its far end 32 which is a male adapted end suitable for coupling to the remainder of the dryer exhaust circuit 28. 26 is drywall, cinder block, concrete or other wall material.

The device functions by the following general method. With the dryer a comfortable distance away from the wall, attachment of 14 to 12 and 30 to 28 is made by conventional means. The dryer is then pushed into place, allowing the opposing magnetic fields of magnets 18' and 36' to come into proximity of the other, at which time they will powerfully attract one another and move toward each other with the flexibility and articulation provided by 20. An audible snapping sound, created by opposing magnetic faces contacting each other, will accompany positive engagement of the magnetic coupling. The audible sound will serve as an indicator to the installer that the connection has been made.

FIG. 3 depicts the device installed completing the dryer exhaust circuit.

CONCLUSIONS, RAMIFICATIONS, AND SCOPE

Accordingly the reader will see that, according to the invention, I have provided a device and means to complete a dryer circuit that provides a convenient and secure method allowing minimum convolutions in the dryer duct path, ease of maintenance and increased fire safety.

While the above description contains many specificities, these should not be construed as limitations on the scope of the invention, but as exemplifications of the presently preferred embodiments thereof. Many other ramifications and variations are possible within the teachings of the invention. For example, the geometry of the magnets could be changed from cylindrical to square, toroidal, conical, convex, concave, etc. The magnets could be altered in size, number, arrangement, and type of magnetic material. The magnets could be coated with a variety of coatings; notably a rubber coating to dampen the impact of the colliding magnetic faces. Another potentially important coating could be a fluorocarbon, or other known, that would facilitate the sealing surfaces sliding across one another after contact, allowing the two halves of the coupling the ability to find the preferred, optimized position, rather than remaining in their initial contact position. The magnets could be mismatched in size, thickness, material, and geometry. For example, the magnet on the wall half of the coupling could be much larger and more powerful than that of the dryer side of the coupling, or the wall side magnet may be ferrite and the dryer side magnet may be discrete neodymium rare earth magnets.

The device may contain an rubber o-ring or other compressible seal. The device could have a conical, ball and socket, or compression fitting-type geometry in either the magnets or the substrates holding the magnetic material without departing from the intended scope of this invention.

It will be appreciated that a simple battery operated circuit that closed with contact of the magnetic faces of the coupling, emitting either light from an LED or sound from a buzzer, could be included in the device if the cost of said circuit seemed warranted. Similarly, a metal bell and hammer could be incorporated into each half of the coupling as an indicator means of proper coupling.

A simple means could be included with the device to help elevate the dryer half of the coupling at the approximate height of the wall half, such as an elastic band attachable at one end near 16, possibly with a loop, and attached to a magnet at the opposite end. The magnet could then be placed on the rear panel of the dryer such to elevate the magnet portion of the dry half of the coupling at the approximate height of the wall half of the coupling. Similarly, the device could include a plastic base, also containing magnets to adhere it to the rear panel of the dryer. The plastic base having a cradle to rest the accordion hose in near the magnetic end, to facilitate the holding of the head at 90° to the rear of the dry and preventing the magnetic portion of the coupling from turning back and attaching itself to the dryer. Though not desirable for the duct path, such installations may be required by the particulars of a building, where the remainder of the dryer circuit must be positioned directly above or below, or sharply to the left or right of the rear of the dryer. For example, where the wall directly behind the dryer is solid concrete.

Figure 6:
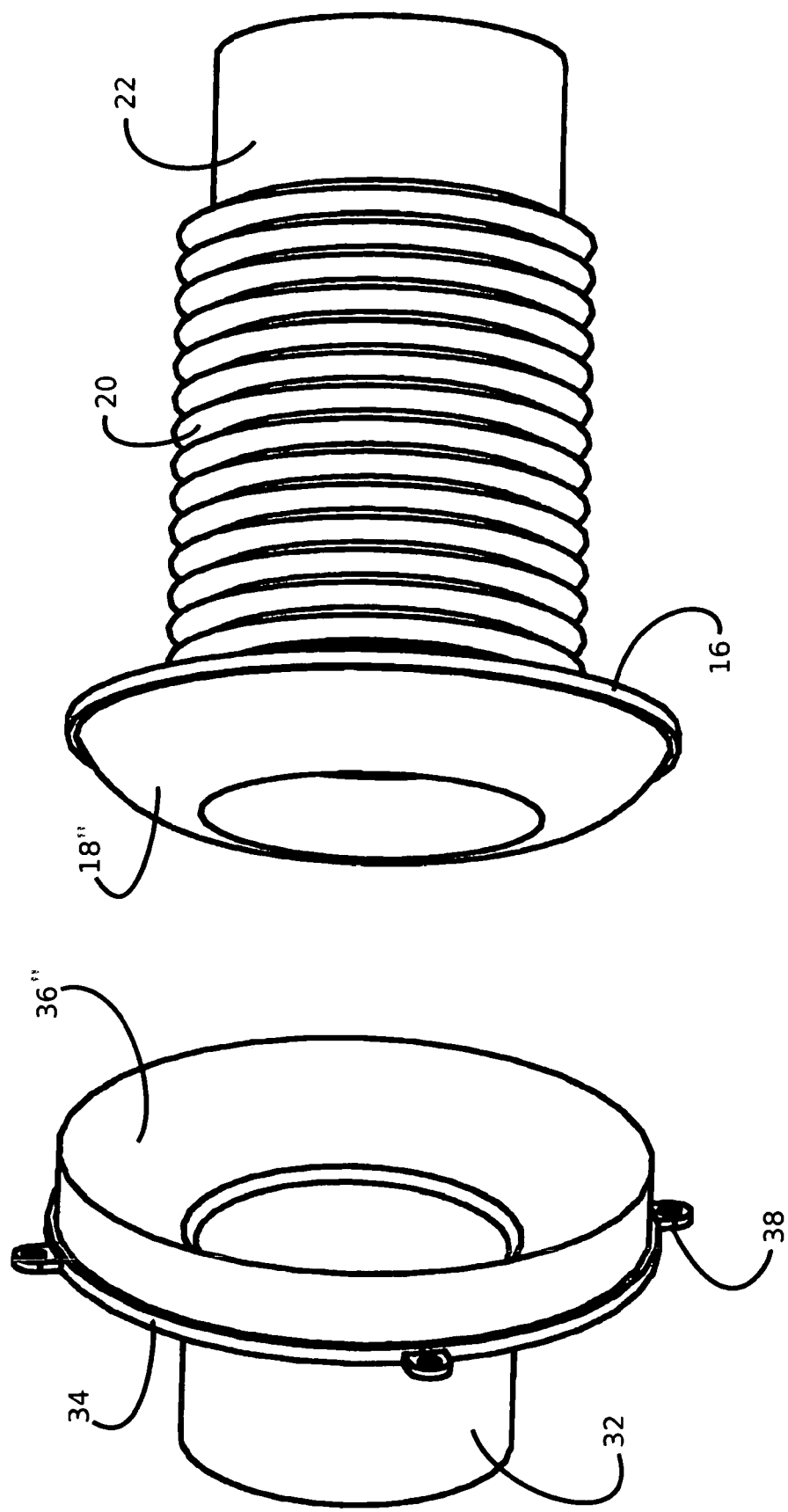
FIG. 6 is an alternate coupling geometry where the two halves of the coupling are nesting cones.

In the embodiment of FIG. 6, an alternate coupling geometry is disclosed where the two halves 18" and 36" of the coupling are nesting cones.

Thus the scope of the invention should be determined by the appended claims and their legal equivalents, and not by the examples given.

What is claimed is:

1. A magnetically positioned dryer vent coupling adapted for use in combination with a clothes dryer, comprising:
    a flexible exhaust duct having a first end adapted for communicating with an exhaust port of the clothes dryer and a second end adapted for communicating with a wall port adjacent the clothes dryer;
    a first mounting substrate located at one end of said flexible exhaust duct and comprising a first magnet, said first mounting substrate defining a center opening having an annular inner peripheral edge forming an annular inner perimeter of said first mounting substrate and an annular outer peripheral edge forming an annular outer perimeter of said first mounting substrate, and wherein said first magnet resides between said inner and outer peripheral edges and produces a magnetic field having one of a north or south outward-facing polarity pointed away from said exhaust duct;

a second mounting substrate adapted for locating proximate one of the dryer exhaust port and wall port and comprising a second magnet, said second mounting substrate defining a center opening having an annular inner peripheral edge forming an annular inner perimeter of said second mounting substrate and an annular outer peripheral edge forming an annular outer perimeter of said second mounting substrate, and wherein said second magnet resides between said inner and outer peripheral edges and produces a magnetic field having an outward-facing polarity opposite the outward-facing polarity of said first magnet; and said first and second mounting substrates comprising respective complementary surfaces configured to nest together between said inner and outer perimeters, said complementary surfaces configured to nest together at any orientation upon magnetic attraction of said first and second magnets with said annular inner peripheral edges of said first and second mounting substrates substantially aligned, such that said annular inner perimeters of said first and second mounting substrates cooperate to form an unobstructed sealed annular opening through which dryer exhaust passes;

whereby when moved into close proximity, said first and second magnets magnetically attract to one another to self-align and self-assemble said first and second mounting substrates of said dryer vent coupling, such that said first and second magnets create an audible snapping sound when engaged thereby indicating a close magnetic seal at said dryer vent coupling.

2. The magnetically positioned dryer vent coupling according to claim 1, wherein said flexible exhaust duct comprises a linearly extensible metal tube.

3. The magnetically positioned dryer vent coupling according to claim 2, wherein said extensible metal tube has an accordion design.

4. The magnetically positioned dryer vent coupling according to claim 2, wherein said metal tube has a diameter of approximately 4 inches.

5. The magnetically positioned dryer vent coupling according to claim 1, and comprising a hose clamp adapted for securing the second end of said flexible exhaust duct to the wall port adjacent the clothes dryer.

6. The magnetically positioned dryer vent coupling according to claim 1, wherein the first and second magnets of said first and second mounting substrates comprise rare earth magnets.

7. The magnetically positioned dryer vent coupling according to claim 1, wherein the first and second magnets of said first and second mounting substrates comprise toroidal magnets.

8. The magnetically positioned dryer vent coupling according to claim 1, wherein at least one of the first and second ends of said flexible exhaust duct comprises a mounting flange.

9. The magnetically positioned dryer vent coupling according to claim 8, wherein said mounting flange defines a mounting hole adapted for receiving a fastener.

10. A clothes dryer, comprising:
 a magnetically positioned dryer vent coupling, comprising:
 (i) a flexible exhaust duct having a first end adapted for communicating with an exhaust port of the clothes dryer and a second end adapted for communicating with a wall port adjacent the clothes dryer;
 (ii) a first mounting substrate located at one end of said flexible exhaust duct and comprising a first magnet, said first mounting substrate defining a center opening having an annular inner peripheral edge forming an annular inner perimeter of said first mounting substrate and an annular outer peripheral edge forming an annular outer perimeter of said first mounting substrate, and wherein said first magnet resides between said inner and outer peripheral edges and produces a magnetic field having one of a north or south outward-facing polarity pointed away from said exhaust duct;
 (iii) a second mounting substrate adapted for locating proximate one of the dryer exhaust port and wall port and comprising a second magnet, said second mounting substrate defining a center opening having an annular inner peripheral edge forming an annular inner perimeter of said second mounting substrate and an annular outer peripheral edge forming an annular outer perimeter of said second mounting substrate, and wherein said second magnet resides between said inner and outer peripheral edges and produces a magnetic field having an outward-facing polarity opposite the outward-facing polarity of said first magnet; and
 (iv) said first and second mounting substrates comprising respective complementary surfaces configured to nest together between said inner and outer perimeters, said complementary surfaces configured to nest together at any orientation upon magnetic attraction of said first and second magnets with said annular inner peripheral edges of said first and second mounting substrates substantially aligned, such that said annular inner perimeters of said first and second mounting substrates cooperate to form an unobstructed sealed annular opening through which dryer exhaust passes;
 whereby when moved into close proximity, said first and second magnets magnetically attract to one another to self-align and self-assemble said first and second mounting substrates of said dryer vent coupling, such that said first and second magnets create an audible snapping sound when engaged thereby indicating a close magnetic seal at said dryer vent coupling.

11. The clothes dryer according to claim 10, wherein said flexible exhaust duct comprises a linearly extensible metal tube.

12. The clothes dryer according to claim 11, wherein said extensible metal tube has an accordion design.

13. The clothes dryer according to claim 12, wherein said metal tube has a diameter of approximately 4 inches.

14. The clothes dryer according to claim 10, and comprising a hose clamp adapted for securing the second end of said flexible exhaust duct to the wall port adjacent the clothes dryer.

15. The clothes dryer according to claim 10, wherein the first and second magnets of said first and second mounting substrates comprise rare earth magnets.

16. The clothes dryer according to claim 10, wherein the first and second magnets of said first and second mounting substrates comprise toroidal magnets.

17. The clothes dryer according to claim 10, wherein at least one of the first and second ends of said flexible exhaust duct comprises a mounting flange.

18. The clothes dryer according to claim 17, wherein said mounting flange defines a mounting hole adapted for receiving a fastener.

\* \* \* \* \*